United States Patent [19]

Friederichs

[11] Patent Number: 5,691,987

[45] Date of Patent: Nov. 25, 1997

[54] FREQUENCY-CHANNEL MULTIPLEXER AND DEMULTIPLEXER

[75] Inventor: Lothar Friederichs, Backnang, Germany

[73] Assignee: ANT Nachrichtentechnik GmbH, Backnang, Germany

[21] Appl. No.: 399,420

[22] Filed: Mar. 8, 1995

[30] Foreign Application Priority Data

Mar. 31, 1994 [DE] Germany .............. 44 11 233.5

[51] Int. Cl.$^6$ ...................................................... H04J 1/00
[52] U.S. Cl. .................. 370/488; 370/480; 333/119
[58] Field of Search ............................ 370/69.1, 57, 53, 370/18, 344, 281, 295, 302, 430, 481, 482, 483, 484, 485, 487, 488, 490, 491, 480; 375/202, 200, 275; 455/17, 25; 333/119, 132, 219, 130, 131, 165–167, 172–179, 181, 17.3; 331/172.9

[56] References Cited

U.S. PATENT DOCUMENTS

| | | | |
|---|---|---|---|
| 3,931,623 | 1/1976 | Sones et al. | 370/75 |
| 4,039,947 | 8/1977 | Miedema | 325/2 |
| 4,211,894 | 10/1978 | Watanabe et al. | 370/57 |
| 4,688,259 | 8/1987 | Edridge | 455/12 |
| 5,233,609 | 8/1993 | Hunton | 370/123 |

FOREIGN PATENT DOCUMENTS

| | | |
|---|---|---|
| 0101531 | 4/1983 | European Pat. Off. . |
| 3226728 | 1/1984 | Germany . |
| 58-139537 | 2/1982 | Japan . |

*Primary Examiner*—Dang Ton
*Attorney, Agent, or Firm*—Spencer & Frank

[57] ABSTRACT

A circuit of low complexity which selects arbitrary channels from a plurality of multichannel input signals and generates from a plurality of individual frequency channels a plurality of output signals whose channel composition can be freely selected, consists of a plurality of bandpass filters (BP1, BP2 ... BPn) which are tuned to the individual frequency channels and whose input and output are respectively connected to a gate of one of a plurality of circulators (Z11, Z12 ... Z1n; Z21, Z22 ... Z2n) connected in a chain. In this case, at least two circulator chains are present (ZK1, ZK2), and a circulator (Z11, Z12 ... Z1n; Z21, Z22 ... Z2n) from one of the circulator chains can be optionally switched to the input and output of each bandpass filter (BP1, BP2 ... BPn).

15 Claims, 2 Drawing Sheets

FREQUENCY-CHANNEL MULTIPLEXER AND DEMULTIPLEXER

BACKGROUND OF THE INVENTION

The present invention relates to a frequency-channel multiplexer and demultiplexer, consisting of a plurality of bandpass filters which are tuned to the individual frequency channels and whose input and output are respectively connected to a gate of one of a plurality of circulators connected in a chain.

Such an arrangement is disclosed in DE 32 26 728 A1. In this case, a plurality of circulator chains are present, each circulator of each circulator chain being connected to a dedicated bandpass filter which is tuned to a receiving or transmitting channel. It is possible in this way for received signals of an antenna to be simultaneously branched into the individual receiving channels, and for a plurality of transmitting channels to be fed into the antenna.

It is the object of the invention to provide an arrangement of the type mentioned at the beginning which is capable, with as small an outlay as possible on circuitry, to demultiplex into individual frequency channels at least two input signals which have a plurality of identical frequency channels, it being possible freely to select from which of the input signals the respective frequency channel originates, and vice versa to form from a plurality of individual frequency channels at least two output signals whose frequency-channel composition can be selected.

SUMMARY OF THE INVENTION

The above object is achieved according to the invention by a frequency channel multiplexer and demultiplexer, consisting of a plurality of bandpass filters which are tuned to individual frequency channels and have an input/output respectively connected to a gate of one of a plurality of circulators connected in a chain, and wherein at least two circulator chains are present, and a circulator from each one of the circulator chains can optionally be switched to the input/output of each bandpass filter. Advantageous developments of the invention follow from the description below.

Owing to the use of switches, preferably transfer switches, between the bandpass filters and the circulator chains, a minimum of bandpass filters and circulators suffices. A reduction in components, and thus in space and weight, is particularly relevant when the frequency-channel multiplexer or demultiplexer is part of a satellite payload.

BRIEF DESCRIPTION OF THE DRAWINGS

The invention will be explained in more detail below with the aid of two exemplary embodiments represents in the drawing, in which.

DETAILED DESCRIPTION OF THE PREFERRED EMBODIMENTS

Figure 1:
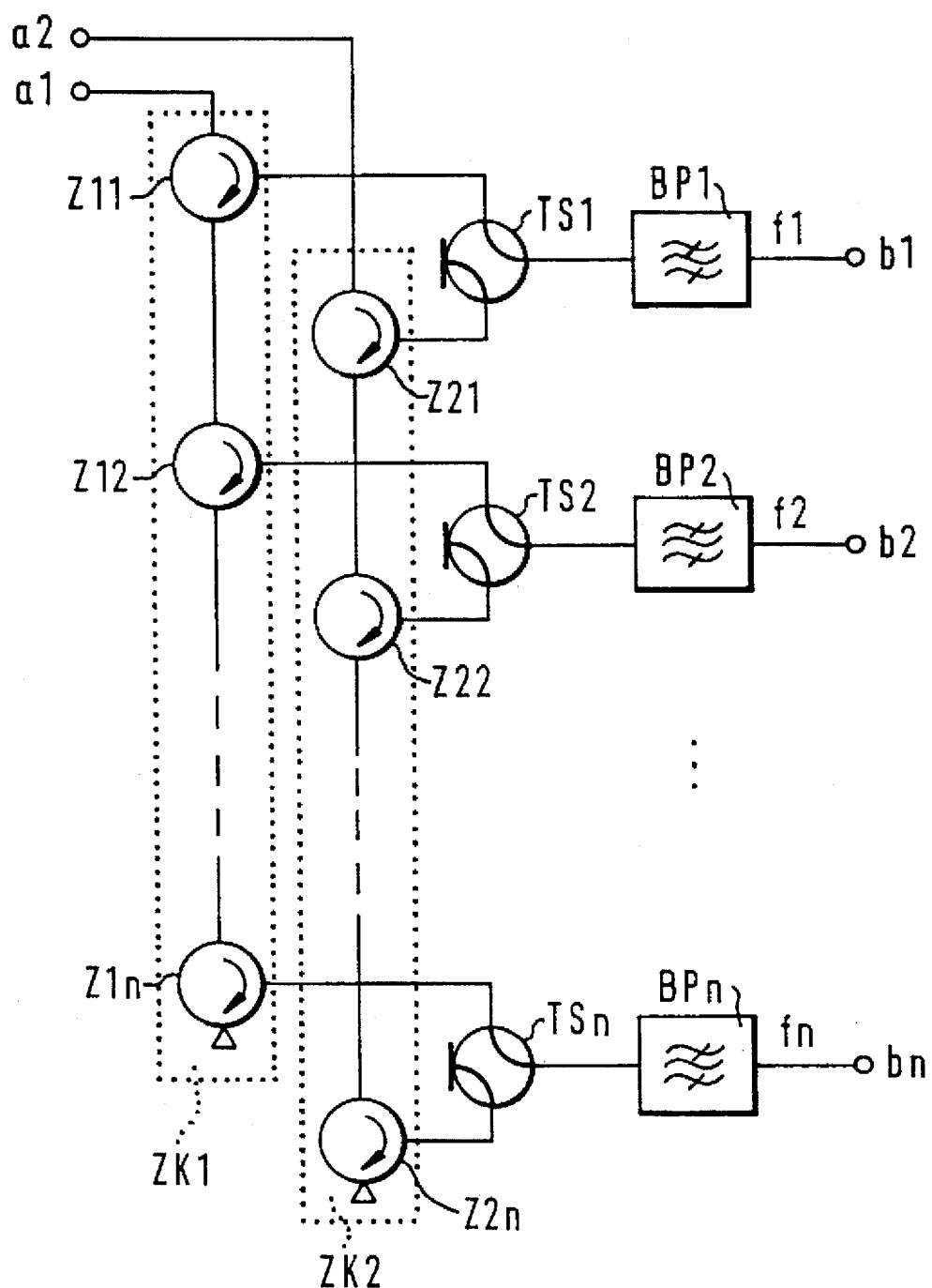
FIG. 1 shows a frequency-channel multiplexer and demultiplexer having two circulator chains.

The circuit represented in FIG. 1 is to be described below in terms of its function as a demultiplexer. In this exemplary embodiment, the circuit is designed for two multiplex input signals a1, a2 which both contain at least partially, the same frequency channels with the mid-frequencies f1, f2 ... fn. A respective circulator chain ZK1, ZK2 is provided for each input signal a1, a2. The two circulator chains ZK1 and ZK2 consist of n series-connected circulators Z11, Z12 ... Z1n and Z21, Z22 ... Z2n, with n being the number of frequency channels occurring. By contrast with the example represented, one circulator chain can also contain fewer circulators than the other chain when the associated input signal contains fewer frequency channels than the other. For each of the frequency channels occurring, there is a bandpass filter BP1, BP2 ... BPn, which can be switched by means of a switch TS1, TS2 ... TSn—preferably a transfer switch—either to the circulator chain ZK1 of the first input signal a1 or to the circulator chain ZK2 of the second input signal a2. Depending on the switch position, either a frequency channel from the first input signal a1 or the same frequency channel from the second input signal a2 can be switched to the associated bandpass filter. If both input signals have, for example, the frequency channel with the mid-frequency f1, in the case of the position of the switch TS1 shown in FIG. 1 the input signal a1 passes to the input of the bandpass filter BP1 via the circulator Z11 and the switch TS1. The second input signal a2 likewise passes via the circulator Z21 to the switch TS1, but is then completely reflected therein at a short circuit and lead back to the circulator Z21, from which it is relayed in the circulator chain ZK2. Since the frequency channel belonging to the bandpass filter BP1 of the second input signal a2 is reflected at the other bandpass filters BP2 ... BPn, it finally passes to a low-reflection termination at the last circulator Z2n of the circulator chain ZK2.

If the circuit represented in FIG. 1 is to be operated as a multiplexer, the direction of rotation of the circulators is reversed. It is then possible to generate from a multiplicity of frequency channels which are present at the inputs b1, b2 ... bn of the bandpass filters BP1, BP2 ... BPn, two multiplex output signals a1 and a2 which are composed of arbitrarily selectable frequency channels.

Figure 2:
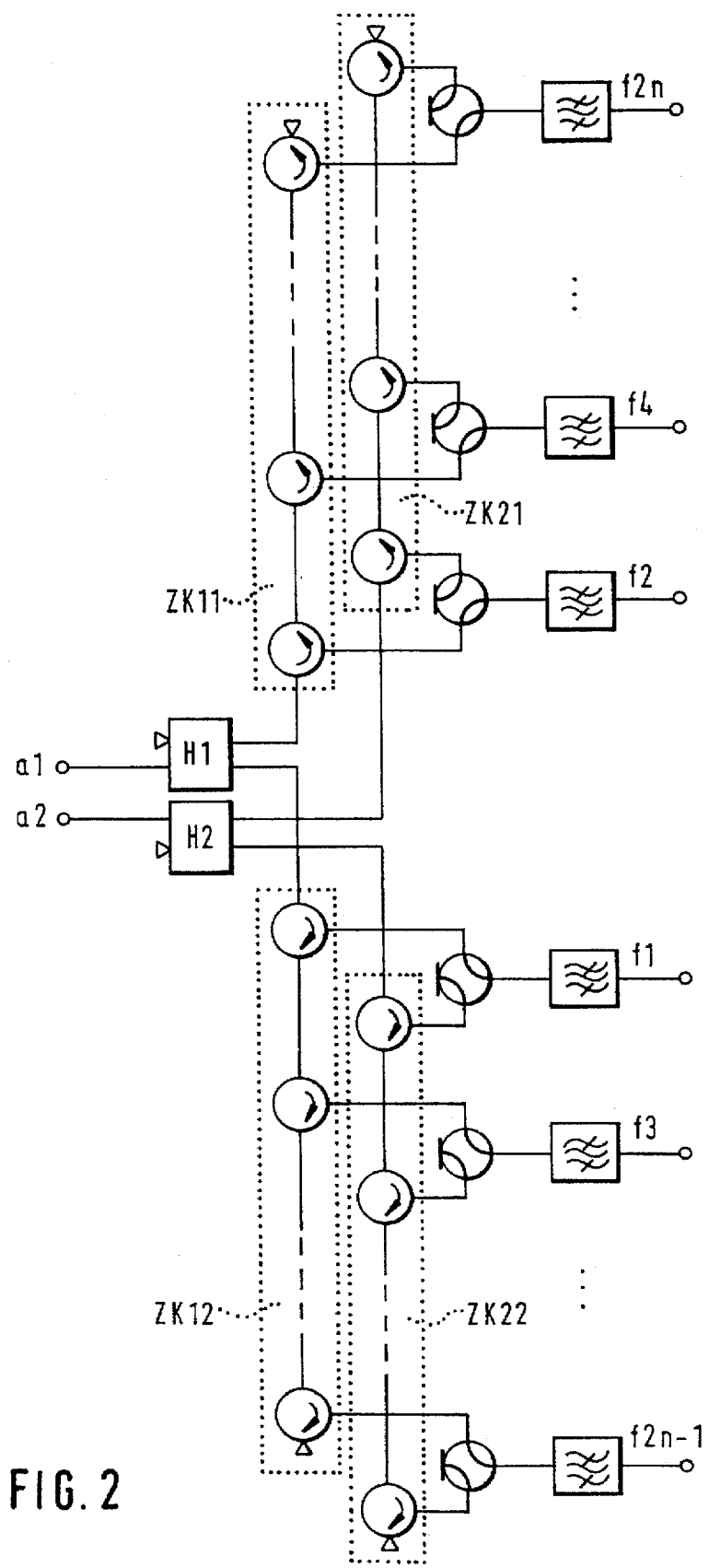
FIG. 2 shows a frequency-channel multiplexer and demultiplexer having four circulator chains.

Two input signals a1, a2 are divided in FIG. 2 between two circuits in accordance with FIG. 1 by means of hybrids H1 and H2 (for example, 3 dB couplers). In this case, bandpass filters for the even frequency channels are connected to the first group of circulator chains ZK11, ZK21, and bandpass filters for the odd frequency channels are connected to the second group of circulator chains ZK12, ZK22. Better separation of closely adjacent frequency channels is achieved thereby.

It is not shown in FIGS. 1 and 2 that group delay equalizers, or devices for setting or balancing the insertion loss or the slope of the insertion loss or the group delay can be connected downstream of the bandpass filters.

I claim:

1. A frequency-channel multiplexer and demultiplexer arrangement, consisting of a plurality of bandpass filters which are tuned to respectively different individual frequency channels and which each have an input/output respectively connected to a gate of one of a plurality of circulators connected in a chain, wherein at least two circulator chains (ZK1, ZK2) are present, and a circulator (Z11, Z12 ... Z1n; Z21, Z22 ... Z2n) from one of the circulator chains (ZK1, ZK2) can optionally be switched to said input/output of each bandpass filter (BP1, BPn).

2. The arrangement as claimed in claim 1, wherein the end of each circulator chain (ZK1, ZK2) is connected to a low-reflection termination.

3. The arrangement as claimed in claim 1, wherein the optional connection of a bandpass filter (BP1, BP2 ... BPn) to a circulator (Z11, Z12 ... Z1n; Z21, Z22 ... Z2n) is performed by means of a transfer switch (TS1, TS2 ... TSn).

4. The arrangement as claimed in claim 1, wherein a plurality of separate groups of said circulator chains (ZK11, ZK21; ZK12, ZK22) are present of which each group of circulator chains is connected to bandpass filters for frequency channels which are not directly adjacent, and the circulator chains (ZK11, ZK21; ZK12, ZK22) composed of their individual groups are interconnected on input and output sides of said circulator chains.

5. The arrangement as claimed in claim 2, wherein a plurality of separate groups of said circulator chains (ZK11, ZK21; ZK12, ZK22) are present of which each group of circulator chains is connected to bandpass filters for frequency channels which are not directly adjacent, and the circulator chains (ZK11, ZK21; ZK12, ZK22) composed of their individual groups are interconnected on input and output sides of said circulator chains.

6. The arrangement as claimed in claim 3, wherein a plurality of separate groups of said circulator chains (ZK11, ZK21; ZK12, ZK22) are present of which each group of circulator chains is connected to bandpass filters for frequency channels which are not directly adjacent, and the circulator chains (ZK11, ZK21; ZK12, ZK22) composed of their individual groups are interconnected on input and output sides of said circulator chains.

7. Frequency-channel multiplexer and demultiplexer comprising:
   a plurality of bandpass filters which are tuned, respectfully, to different individual frequency channels and which each have a first and a second input/output terminal; a plurality of circulator chains, each consisting of a plurality of circulators connected in series and each having a signal input/output at one end of the chain; and means for selectively connecting said first input/output terminal of each of said bandpass filters to a gate of a respective circulator in each of said circulator chains.

8. The frequency-channel multiplexer and demultiplexer as defined in claim 7 wherein a further end of each of said circulator chains is connected to a respective low reflection termination.

9. The frequency-channel multiplexer and demultiplexer as defined in claim 7 wherein said means for selectively connecting comprises respective transfer switches connecting respective said first input/output terminals to respective gates of said circulators of said circulator chains.

10. The frequency-channel multiplexer and demultiplexer as defined in claim 7 wherein said bandpass filters are for frequency channels which are not directly adjacent; and further comprising a further plurality of said bandpass filters for non-directly adjacent frequency channels different than said frequency channels for the first plurality of bandpass filters; a further plurality of said circulator chains each having a signal input/output at one end of the respective chain; and further means for selectively connecting said input/output terminals of said further plurality of bandpass filters to a gate of a respective circulator in each of said further plurality of circulator chains; and means for interconnecting said signal input/output of said circulators chains of said plurality and further plurality of circulator chains to provide combined signal input/outputs containing all connected frequency channels.

11. The frequency-channel multiplexer and demultiplexer as defined in claim 10 wherein an opposite end of each of said circulator chains is connected to a respective low-reflection termination.

12. The frequency-channel multiplexer and demultiplexer as defined in claim 10 wherein said means for selectively connecting and said further means for selectively connecting comprise respective transfer switches.

13. A frequency-channel multiplexer and demultiplexer arrangement, comprising: a plurality of bandpass filters which have different center frequencies and are tuned to different individual frequency channels, with each said bandpass filter having a first and a second input/output terminal; at least two circulator chains each including a respective plurality of circulators, each having first, second and third sequential gates in a direction of circulation, with the circulators of each respective chain being connected in series via the respective first and third gates; and means for selectively connecting the second gate of each circulator of a respective chain to the first input/output terminal of a respective bandpass filter.

14. The arrangement as claimed in claim 13, wherein: one end of each circulator chain comprises a signal input/output for the arrangement; an opposite end of each circulator chain is connected to a respective low reflection termination; and the second input/output terminal of each bandpass filter comprises a frequency channel signal output/input, respectively, for the arrangement.

15. The arrangement as claimed in claim 14, wherein said means for selectively connecting comprises a plurality of switches, each selectively connecting either the second gate of a circulator of one of the circulator chains or the second gate of a circulator of another of the circulator chains to the first input/output terminal of a respective bandpass filter.

* * * * *